US010371511B2

(12) United States Patent
May et al.

(10) Patent No.: US 10,371,511 B2
(45) Date of Patent: Aug. 6, 2019

(54) DEVICE AND METHOD FOR GEOMETRICALLY MEASURING AN OBJECT

(71) Applicant: TAYLOR HOBSON LTD., Leicester (GB)

(72) Inventors: Thilo May, Darmstadt (DE); Christian Am Weg, Langen (DE)

(73) Assignee: TAYLOR HOBSON LTD., Leicester (GB)

( * ) Notice: Subject to any disclaimer, the term of this patent is extended or adjusted under 35 U.S.C. 154(b) by 300 days.

(21) Appl. No.: 15/312,481

(22) PCT Filed: May 13, 2015

(86) PCT No.: PCT/EP2015/000986
§ 371 (c)(1),
(2) Date: Nov. 18, 2016

(87) PCT Pub. No.: WO2015/180826
PCT Pub. Date: Dec. 3, 2015

(65) Prior Publication Data
US 2017/0089695 A1    Mar. 30, 2017

(30) Foreign Application Priority Data

May 19, 2014  (DE) .................. 10 2014 007 201

(51) Int. Cl.
*G01B 21/04*    (2006.01)
*G01B 21/16*    (2006.01)
(Continued)

(52) U.S. Cl.
CPC ............. *G01B 21/04* (2013.01); *G01B 21/16* (2013.01); *G01B 21/20* (2013.01); *G01M 11/00* (2013.01)

(58) Field of Classification Search
CPC ...... G01B 21/04; G01B 21/20; G01B 11/026; G01B 11/303; G01B 21/042; G01B 21/045; G01B 11/06; G01B 21/16
(Continued)

(56) References Cited

U.S. PATENT DOCUMENTS 6,008,901 A * 12/1999 Ohtsuka ............... G01B 11/255
356/489
6,072,569 A    6/2000 Bowen
(Continued)

FOREIGN PATENT DOCUMENTS

CN    101915554 A    12/2010
CN    103075963 A    5/2013
(Continued)

OTHER PUBLICATIONS

European Patent Office, International Search Report for International Application No. PCT/EP2015/000985, 3 Pages, dated Oct. 12, 2015 (dated Oct. 12, 2015), WIPO WO 20151176805 A1 dated Nov. 26, 2015 (dated Nov. 26, 2015) pp. 41-43.
(Continued)

*Primary Examiner* — Yaritza Guadalupe-McCall
(74) *Attorney, Agent, or Firm* — Christopher C. Dremann, P.C.; Christopher C. Dremann

(57) ABSTRACT

A device and method for geometrically measuring an object includes a carrier for the object, at least one reference object that can be fixed relative to the carrier, and a holder which can be moved in at least one direction (x,z) relative to the reference object and on which a reference body and a distance measuring device are arranged, which distance measuring device is designed for measurement of a distance between the object and the reference body. A first and a second reference sensor are arranged at a distance from each other on the holder or on the reference body while facing the (Continued)

reference object, said reference sensors being designed to measure a first and a second distance to the reference object.

17 Claims, 6 Drawing Sheets

(51) Int. Cl.
*G01B 21/20* (2006.01)
*G01M 11/00* (2006.01)

(58) Field of Classification Search
USPC .......................................................... 33/503
See application file for complete search history.

(56) References Cited

U.S. PATENT DOCUMENTS

| | | | | |
|---|---|---|---|---|
| 8,736,850 | B2* | 5/2014 | Am Weg | G01B 21/04 356/601 |
| 9,772,182 | B2* | 9/2017 | Am Weg | G01B 21/042 |
| 2006/0102833 | A1 | 5/2006 | Eiff | |
| 2006/0290942 | A1* | 12/2006 | Henselmans | G01B 21/04 356/498 |
| 2008/0175471 | A1 | 7/2008 | Eiff | |
| 2009/0241356 | A1* | 10/2009 | Koyama | G01B 5/0002 33/200 |
| 2010/0225926 | A1* | 9/2010 | van Amstel | G01B 11/026 356/511 |
| 2010/0231923 | A1 | 9/2010 | Ge et al. | |
| 2011/0080593 | A1* | 4/2011 | Sato | G01B 11/24 356/512 |
| 2013/0077100 | A1 | 3/2013 | Fukui et al. | |
| 2013/0308139 | A1* | 11/2013 | Am Weg | G01B 21/04 356/612 |
| 2015/0226548 | A1* | 8/2015 | Am Weg | G01B 21/042 356/4.01 |
| 2017/0082521 | A1* | 3/2017 | May | G01M 11/0221 |
| 2017/0089695 | A1* | 3/2017 | May | G01B 21/04 |

FOREIGN PATENT DOCUMENTS

| | | |
|---|---|---|
| DE | 19827788 A1 | 12/1999 |
| DE | 10 2011 011065 A1 | 8/2012 |
| EP | 1 519 144 A1 | 3/2005 |
| JP | H11211427 A | 6/1999 |
| JP | 2000266524 A | 9/2000 |
| JP | 2006125893 A | 5/2006 |

OTHER PUBLICATIONS

WIPO & ISA/EP, International Preliminary Report on Patentability and Written Opinion of the International Searching Authority; International Application No. PCT/EP2015/000986, dated Nov. 22, 2016 (Nov. 22, 2016), 9 pages, The International Bureau of WIPO, Geneva, Switzerland.

State Intellectual Property Office (SIPO) of the People's Republic of China, First Office Action for Chinese Application No. 2015800264727, dated May 30, 2018, 7 pages, Beijing China.

State Intellectual Property Office (SIPO) of the People's Republic of China, Search Report for Chinese Application No. 2015800264727, dated May 20, 2018, 3 pages, Beijing China.

* cited by examiner

DEVICE AND METHOD FOR GEOMETRICALLY MEASURING AN OBJECT

CROSS-REFERENCE TO RELATED APPLICATIONS

This application is the National Stage of International Application No. PCT/EP2015/000986 filed on May 13, 2015, which claims the benefit of foreign priority to German Patent Application No. DE 10 2014 007 201.0 filed on May 19, 2014, the entire disclosures of which are hereby incorporated by reference.

FIELD OF THE INVENTION

The present invention relates to an apparatus for the geometric measurement of an object, in particular of optical components such as, for example, lenses. The invention moreover relates to a corresponding method and a computer program for the geometric measurement of such objects.

BACKGROUND OF THE INVENTION

There is an increasing demand for high-resolution precise measurements of workpieces or, in general, of objects for the purposes of quality assurance and also for monitoring industrial production processes, particularly in the fields of precision engineering, optics and in production technology for mechanical and electrical microstructures.

Thus, DE 10 2011 011 065 B4 has disclosed an apparatus for measurement of at least one surface section of an object mounted on a carrier. Here, the apparatus comprises a reference object, which is fixable in relation to the carrier, and a holder that is movable in relation to the reference object in at least one first direction. A reference body and a distance sensor, which are mounted in a manner rotatable relative to one another, are arranged on the holder. Here, the distance measuring device is embodied to determine a first distance to a first point on the surface section of the object and a second distance to a second point of the reference body corresponding therewith. Here, the distance measuring device referred to as distance measuring unit comprises a first distance sensor facing the object and a second distance sensor facing the reference body. In so doing, these are aligned diametrically opposite to one another.

Using such an apparatus, the surface of an object may be optically probed or scanned in a highly precise and contactless manner.

The apparatus known in principle from DE 10 2011 011 065 B4 is depicted schematically in FIG. 3. The measuring device 10 has a carrier 12, on which an object 14 to be measured, such as, for example, a lens, is mounted in a rotatable or displaceable manner. The apparatus 10 further comprises a holder 26 which is movable in the xz-plane shown in FIG. 3 and on which a reference body 28 and a bearing 32 for rotatably mounting two distance sensors 34, 36, which form a distance measuring device 70, are arranged. The reference body 28 has a reflecting or mirroring reference surface 30 facing the distance sensor 36, said reflecting or mirroring reference surface in the present case being embodied approximately in the style of a cylinder inner wall. By way of example, this may be configured as a concave mirror. Diametrically opposite the distance sensor 36, the distance measuring device 70 comprises a further distance sensor 34 with approximately the same design. The latter is aligned diametrically opposite the distance sensor 36. The two distance sensors 34, 36 are rigidly coupled to one another.

The distance sensor 34 is directed to the surface 15 to be measured of the object 14. The distance sensors 34, 36 are embodied as optical distance sensors and hence embodied to emit and detect light signals. The sensors 34 and 36 measure in reflection geometry. That is to say, a measurement beam directed to a measurement point 42 of the object 14 is reflected and mirrored back in accordance with the surface contour of the object 14 and re-detected by the sensor 34 due to an approximately orthogonal alignment of the measurement beam in relation to the surface 15 of the object 14 and subsequently fed to a controller with a sensor and detection unit, said controller being coupled to the distance sensor 34. Depending on the contour of the object 14 to be measured and the relative position of the holder 26 in relation to the object 14, the alignment and orientation of the distance sensors 34, 36 in relation to the axis of rotation 33 on the holder 26 should be modified and adaptively adapted in each case in order to observe the orthogonality conditions required for the measurement.

It is necessary to scan the entire cross-sectional contour perpendicular to the longitudinal extent of the object 14 by means of the distance sensor 34, particularly when measuring objects 14 that are not rotationally symmetric, such as, for example, a cylindrical lens which is indicated in the cross section in FIG. 3 and which extends perpendicular to the plane of the paper, in particular in the y-direction, in terms of the longitudinal extent thereof.

It may be difficult to position the distance sensor 34 at a required distance and with the alignment relative to the object 14 required for the distance measurement, particularly in the case of strongly curved surfaces 15 of objects 14 to be measured. As depicted in FIG. 3, situations may occur in which the reference body 28 would, for example, collide with a limb with the object 14 to be measured, said limb facing the object or the object carrier 12 and projecting downward.

Naturally, such a collision should be avoided. However, a certain geometric extent of the reference body 28 is unavoidable in order also to be able to scan the surface sections of the object 14, inclined strongly in relation to the horizontal, in an orthogonal direction.

In order further to precisely determine the position of the distance measuring device 70, in particular of the two distance sensors 34, 36, and the position of the reference body 28 in the xz-plane, two further distance sensors, referred to as reference senses 50, 52 in the present case, are provided on the holder 26, which distance sensors are aligned relative to the stationary reference objects 18, 20 in accordance with the displacement or movement directions (x, z) of the carrier 26 and by means of which the distance 48 of the carrier 26 to the reference surface 22 of the reference object 18 is measurable in the z-direction, as is the distance 46 in the x-direction to the further reference object 20, and the reference surface 24 thereof, arranged in a stationary manner.

The virtual extensions 1, 2, sketched in FIG. 3, of the measurement axes of the reference sensors 50, 52 coincide with the axis of rotation 33 of the distance measuring device 70. As a result of this, the entire apparatus is substantially invariant in relation to possible rotational movements or tilting movements of the carrier 26 or of the reference body 28 in the measuring plane (x, z) formed by the x-direction and z-direction. The superposition of the imagined extensions 1, 2 of the measurement axes of the reference sensors 50, 52 with the axis of rotation 33 of the two distance sensors 34, 36 rigidly coupled to one another was found to be particularly advantageous from a metrological point of view. However, this also sometimes greatly restricts the geometric design freedom for the holder 26 and, in particular, for the reference body 28 arranged thereon.

In contrast thereto, the present invention is now based on the object of providing an improved apparatus for the geometric measurement of an object, said apparatus provides an increased degree of design freedom for the reference body such that possible collisions between the reference body and the object to be measured may be reliably avoided without restricting the measurement accuracy in the process.

This object is achieved by an apparatus for the geometric measurement of an object as claimed in patent claim 1 in accordance with the forthcoming description and the corresponding appended claims, by a method for the geometric measurement of an object according to the forthcoming description and the corresponding appended claims and by a computer program according to the forthcoming description and the corresponding appended claims. Here, advantageous configurations are the subject matter of additional appended claims.

In this respect, an apparatus for the geometric measurement of an object is provided. The apparatus comprises a carrier for the object and at least one reference object which is fixable opposite to the carrier. Typically, carrier and reference object are arranged in a stationary manner and have a fixed geometric relation to one another. The apparatus further comprises a holder that is movable in relation to the reference object in at least one direction (x, z). A reference body and a distance measuring device are arranged on the holder. Here, the distance measuring device is configured to measure a distance between the object, in particular the object surface facing the distance measuring device, and the reference body, in particular a reference surface of the reference body facing the object.

Furthermore, a first reference sensor and a second reference sensor are arranged spaced apart from one another on a side of the holder or of the reference body facing the reference object. The two reference sensors are embodied to measure a first distance and a second distance to the reference object. In this respect, both reference sensors arranged on one and the same side of the holder or of the reference body each measure a distance to one and the same reference object. Should different distances arise in the process, this is a measure for a possible tilt of the holder in relation to the alignment of the reference object. By means of two reference sensors arranged on a side of the holder or of the reference body facing the reference object, a possible tilt, and hence not only the relative position but also the alignment of the holder 126, may be established in the measuring plane (x, z) and may be used to correct the distance values measurable by the distance measuring device 70.

Arranging at least two reference sensors on a side facing the reference object or a corresponding section of the holder or of the reference body renders it possible to displace the virtual intersection of the extension of the measurement axes of the reference sensors into a region away from the axis of rotation of the distance measuring device. In this respect, the apparatus facilitates very multifaceted and very different geometric configurations of the holder and of the reference body arranged thereon.

According to a development hereof, provision is made for the first reference sensor to be embodied to measure the first distance to a first point of a reference surface of the reference object facing the holder. In principle, a first distance between the holder and the reference surface of the relevant reference object is determinable by means of the first reference sensor.

According to a further development, provision is made for the second reference sensor also to be embodied to measure the second distance to a second point of the reference surface of the reference object facing the holder. Typically, the first reference sensor and second reference sensor are aligned parallel to one another. However, they are arranged spaced apart from one another on the holder with a predetermined distance perpendicular or oblique to the respective measurement direction. If the holder should be subject to a swivel or tilt movement, this may be ascertained by a comparison of the first and second distances which are measurable independently of one another by means of the first reference sensor and the second reference sensor and which are determinable in this respect.

According to a further configuration of the apparatus, provision is made for a distance (d) between the first point and the second point of the reference surface to correlate with the distance (D) between the first reference sensor and the second reference sensor. Here, it is conceivable for the distance (d) between points on the reference surface to approximately correspond to the distance (D) between the first reference sensor and the second reference sensor or to be largely identical thereto. In such a configuration, the reference sensors are aligned parallel to one another. Here, in particular, they may be aligned substantially perpendicular to the reference surface or perpendicular to the reference object.

According to a further configuration, the apparatus furthermore comprises a controller configured as a detection unit, by means of which the position and the alignment of the holder, or the reference body thereof, relative to the at least one reference object is precisely determinable from the first distance and the second distance. In particular, it is possible to determine both the position of the holder and the inclination/tilt thereof in the measuring plane (x, z) from a comparison and/or forming the mean value of the first and second distances measured independently of one another. In particular, the position of the axis of rotation of the distance measuring device is precisely determinable herewith.

According to a further configuration, the holder is movable relative to a first reference object and to a second reference object in a plane (x, z) spanned by a first direction (x) and a second direction (z). In this respect, the holder may be moved relative to the object in a two-dimensional xz-plane and, with the distance sensor thereof facing the object, always be aligned substantially orthogonal to a measurement point on the object surface in accordance with the nature and contour of the object surface. Typically, the first and second reference object extend perpendicular to one another. They are fixed both relative to one another and to the carrier of the object.

According to a further configuration, provision is made for the first reference sensor and the second reference sensor to be respectively aligned to the first reference object. Provision is further made of a third reference sensor, which is aligned to the second reference object. Provision is typically made for the first reference object and the second reference object to be aligned perpendicular or orthogonal to one another and for the reference sensors facing the respective reference objects to be aligned substantially perpendicular to the reference surfaces of the relevant reference objects.

Possible tilt or swivel movements of the holder, for example in the xz-plane, induced by the movement of the holder do not yet lead to an infringement of the orthogonality condition required for the distance measurement. However, in view of the demanded measurement accuracy in the range of a few nanometers or less, they may have huge effects on the accuracy of the measurement to be obtained with the distance measuring device. The position of the carrier, and hence also of the reference body thereof, and of the distance measuring device mounted in a rotatable manner relative to the reference body may be determined in the two directions of the measuring plane (x, z) by means of the total of three reference sensors. Moreover, even an only small inclination of the carrier relative to one of the reference objects is determinable with the aid of the first reference sensor and the second reference sensor.

According to a further configuration, the first reference object is aligned further parallel to the first direction (x) and the second reference object is aligned parallel to the second direction (z), the two directions x, z being aligned perpendicular to one another. By way of example, if the carrier is moved along the first direction (x), this changes the distance of the carrier in the x-direction and hence the distance of the carrier from the second reference object. Such a change in the distance may be precisely ascertained by means of the third reference sensor. For the purposes of measuring the movement of the carrier in the other direction of the measuring plane, in particular in the vertically aligned z-direction, a changing distance from the first reference object 18 resulting therefrom may be ascertained at the same time by means of the first reference sensor and the second reference sensor. If different distance values emerge in the process, this is an indication for a tilt or even only a small inclination or twist of the carrier in the measuring plane (x, z).

According to a further configuration, the distance measuring device comprises a first distance sensor and a second distance sensor, which are rotatably mounted relative to the reference body. By means of the two distance sensors, it is possible to precisely ascertain the overall distance between the surface of the object and a reference surface of the reference body for all angular positions of the distance measuring device. Possible position inaccuracies of the first and second distance sensors of the distance measuring device caused by the rotational movement of the latter may be ascertained precisely by the diametrically opposite measurement of the distance firstly to the object surface and secondly to the reference object, and may be compensated by calculation.

The distance measuring device is further embodied to determine a first distance to a first point on the surface section, to be measured, of the object and a second distance to a second point of the reference body corresponding therewith. The first distance to be ascertained by means of the distance measuring device represents the actual measurement signal, while a relative displacement, for example caused by rotation, between the distance measuring device and the reference body likewise arranged on the movable holder may be ascertained on the basis of the measured second distance. In this respect, a distance correction for the first measured distance may be carried out on the basis of the second distance to be measured.

A non-reproducible displacement of the sensors, for example caused by the rotational movement of the distance measuring device, and a falsification of the measurement values resulting therefrom may be compensated by determining the second distance in relation to a reference body known in respect of the contour and position thereof. An offset between an axis of rotation and a measurement axis of the distance measuring device may be compensated, by computation, by ascertaining the first and second distances and by a relative alignment of reference body and distance measuring device.

The distance measuring device, in particular the two distance sensors thereof, is situated with the at least two reference sensors, typically with the three reference sensors, in a common plane, the so-called measuring plane. In this way, it is possible to capture using sensors all factors relevant to the surface measurement and distance measurement in the measuring plane, in particular an inclination and/or a tilt of the reference body in the measuring plane, and compensate these for the precision of the actual measurement.

According to a further configuration, provision is made for the first distance sensor of the distance measuring device to face the carrier or the object arranged thereon and for the second distance sensor to face the reference body. Typically, the first distance sensor and second distance sensor are aligned diametrically opposite to one another. They are rigidly coupled to one another such that each point on the object surface to be probed or to be measured contactlessly has assigned to it a point corresponding thereto on the reference surface of the reference body.

According to a further configuration, provision is made for an object holder to be mounted on the carrier in a rotatable or linear translationally displaceable manner. In the case of a rotational bearing, the axis of rotation of the object holder typically lies in the measuring plane of the distance measuring device or it extends parallel to the measuring plane. From a measurement point of view, rotatably bearing the object holder on the carrier device is advantageous, particularly for measuring rotationally symmetric objects. An object rotating on the carrier device may be probed or contactlessly scanned radially from out to in or from in to out by the distance measuring device during the rotational movement of the object.

In the case of a translational bearing, the translation or displacement direction typically extends perpendicular, or at a predetermined angle, to the measuring plane of the distance measuring device. A translational bearing of the object on the carrier device was found to be advantageous, particularly for step-by-step scanning or probing of objects with cylindrical symmetry, for example cylindrical lenses. Here, in particular, provision can be made for the longitudinal axis of the object to be measured to be aligned in the direction of the translational axis of the carrier device and for the object to be arranged accordingly on the object holder.

According to a further configuration, the holder movably arranged on a base above the carrier is displaceable beyond opposite outer edges of the object or beyond opposite outer edges of the object carrier. Such a displacement option and movability of the holder on the base and opposite to the carrier facilitates scanning or contactless, in particular optical probing of the whole surface contour of an object. In this way, it is also possible to precisely measure objects which are not rotationally symmetric or the surface thereof.

The distance sensors or reference sensors are typically coupled to a plurality of light sources with different wavelengths in order to determine the distance to the object or to the reference body or reference object by means of a multi-wavelength measurement principle. Such a heterodyne measuring method facilitates a highly precise distance measurement with a resolution in the nanometer and sub-nanometer range and may further provide a uniqueness range of the measurement result up into the millimeter range. Preferably, largely monochromatic lasers are provided as light sources, the wavelengths of which lie in the range between 1520 nm and 1630 nm. Typically, the employed laser wavelengths lie in the S, C or L band of the optical telecommunications spectrum. However, in principle, wavelengths in the visible and/or UV spectral range are also conceivable.

In principle, the invention is also implementable for a distance measuring device operating at only one wavelength. However, the uniqueness range of the received signals may visibly be increased by means of a multi-wavelength measurement method. The respective phase or phase angle of the beams reflected by the object surface is detected in a wavelength-selective manner and processed within the scope of an electronic evaluation for the purposes of determining the distance.

Furthermore, the distance sensors may be coupled to the relevant light sources by fiber-optical means. In this way, it is possible to restrict possible disturbing influences, caused by the surroundings, to a minimum.

According to a further aspect, the invention further relates to a method for the geometric measurement of an object by means of an above-described apparatus. The surface contour of an object mounted on the carrier is in this case captured in a scanning, In particular surface-probing, manner by means of the distance measuring device rotatably arranged on the holder. Individual measurement points of the surface of the object are successively impinged by a measurement beam such that a distance is ascertainable for each measurement point. In this respect, a plurality of distances are measured between measurement points of the object and reference points of the reference body during a scanning process by means of the distance measuring device. From these, a surface image of the object is produced, in particular calculated in a computer-assisted manner.

Furthermore, the position and the alignment of the holder, or of the reference body thereof, relative to the at least one reference object are established by means of the first reference sensor and the second reference sensor. To the extent that the apparatus only provides for one degree of freedom of motion for the holder, the implementation of only two reference sensors, which are typically aligned in parallel and spaced apart from one another perpendicular to the measurement direction thereof, is, in principle, sufficient. In a development of the apparatus, and accordingly also in a development of the method, provision is made for the position and alignment of the holder to be ascertained in a two-dimensional measuring plane (x, z) by means of the first reference sensor, the second reference sensor and a third reference sensor. Then, the surface image is corrected on the basis of the position determination and the alignment determination of the holder and/or of the reference body.

Thus, in particular, provision is made for the alignment of the holder ascertained by means of the first reference sensor and the second reference sensor to be used for correcting the distances measured by the distance measuring device between the measurement points of the object and the reference points of the reference body. In this way, distance measurement errors caused by very small inclinations or tilts of the holder may be compensated by calculation.

It should be noted here that the aforementioned method may be carried out by means of the apparatus described above and that, in this respect, all features and advantages described in relation to the apparatus also apply equally to the method; and vice versa.

According to a further aspect, the invention further relates to a computer program for the geometric measurement of an object by means of an above-described apparatus. The computer program comprises program means for capturing the surface contour of an object, mounted on the carrier, in a scanning manner by means of the distance measuring device. To this end, the computer program is equipped with program means for measuring a plurality of distances between the measuring points of the object and reference points of the reference body with the aid of the distance measuring device. Furthermore, the computer program comprises program means, by means of which the position and alignment of the holder, or of the reference body thereof, relative to the reference object are established on the basis of distances measured by the first reference sensor and the second reference sensor. Finally, provision is made of program means for correcting the surface image on the basis of the established or measured position and alignment of the holder, or of the reference body thereof.

It should further be noted here that the computer program runs in the controller coupled to the apparatus and is correspondingly implementable in said controller. The computer program serves, in particular, for the computer-assisted implementation of the above-described method when the apparatus, likewise described above, is used as intended. In this respect, all features, properties and advantages specified in view of the apparatus and in view of the method also apply equally to the computer program; and vice versa.

BRIEF DESCRIPTION OF THE DRAWINGS

Further goals, features and advantageous configurations of the invention will be described in more detail on the basis of the following description of an exemplary embodiment.

DETAILED DESCRIPTION OF EMBODIMENTS OF THE INVENTION

Figure 1:
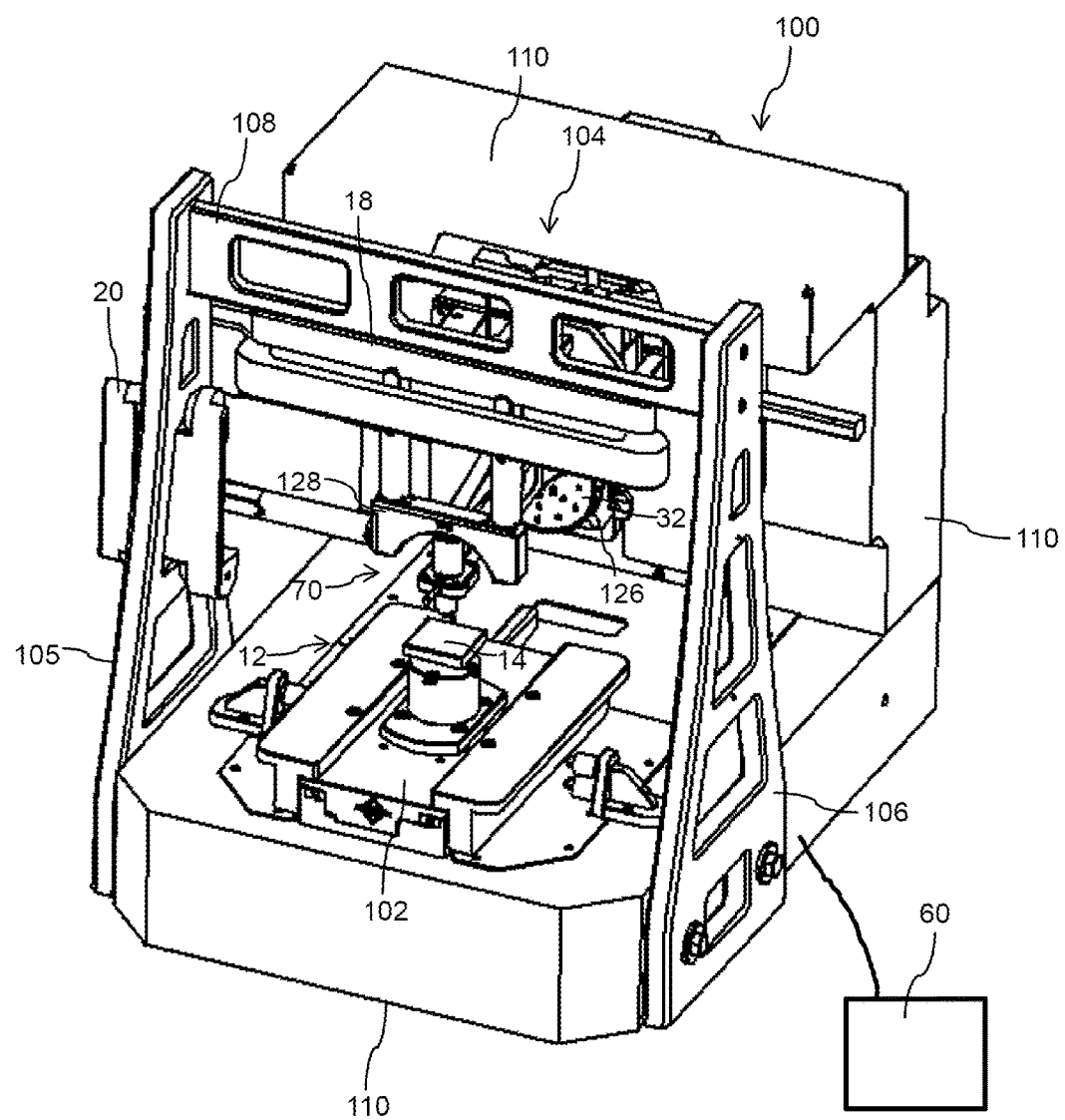
FIG. 1 shows a perspective illustration of the apparatus for the geometric measurement of an object.

The measuring apparatus 100 shown in FIG. 1 in a perspective illustration has a stationary base 110, on which an object holder 102 of a carrier device 12 is, for example, mounted in a translationally displaceable manner. An object 14 to be measured is adapted to be arranged on the carrier device 12, and consequently on the object holder 102 thereof.

On the base 110 thereof, the apparatus 100 comprises a frame 104 which spans the carrier device 12 and essentially defines a measuring plane (x, z). Said frame is connected to the base 110 in a secure and rigid manner. The frame 104 has two lateral limbs 105, 106 and, above the carrier device 12, a connecting bar 108 extending between the lateral limbs 105, 106. A first reference object 19 is arranged on the lower side of the connecting bar 108, while a second reference object 20 is arranged on an inner side of the left limb 105 facing the carrier device 12.

The two reference objects 18, 20, which are stationary and fixed in relation to one another and, in the present case, aligned orthogonally with respect to one another, are fastened in an immobile and rigid manner on the frame 104. The reference object 18 extends along a first direction (x), approximately horizontally, and the second reference object 20 extends perpendicular thereto along a second direction (z), approximately vertically. Individual reference surfaces 22, 24, which are typically embodied as mirror surfaces or as reflecting surfaces, are provided on both reference objects 18, 20. The reference objects 18, 20 are arranged in a stationary manner on the base 110 by means of the frame 104.

The reference objects 18, 20 are also arranged in a stationary manner in relation to the carrier device 12 for the object 14 to be measured by means of the frame 104. Furthermore, a holder 126 which is movable in the measuring plane (x, z) is arranged on the base 110. A distance measuring device 70, which is mounted on the holder 126 in a manner swivelable in relation to an axis of rotation by means of a bearing 32 is arranged on the holder 126. The axis of rotation 33 of the bearing 32 in this case extends perpendicular to the measuring plane (x, z), and consequently in the y-direction. The holder 126 is mounted on the base 110 in a manner movable in relation to the measuring plane (x, z).

Figure 4:
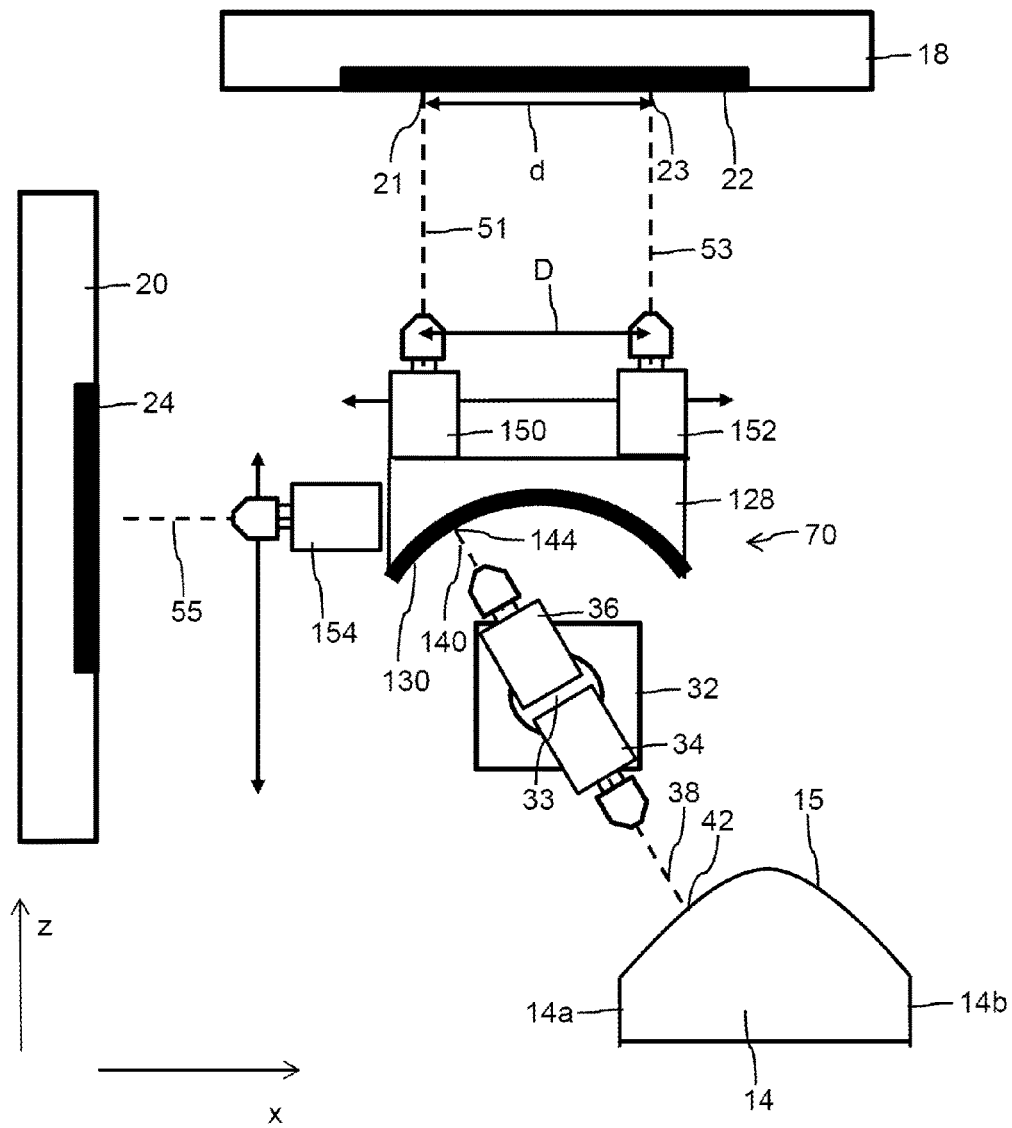
FIG. 4 shows a schematic illustration of the apparatus according to the invention in a first configuration.

As shown in FIGS. 1 and 4, a reference body 128 and a bearing 132 for rotatably bearing two distance sensors 34, 36 are arranged on the holder 126. The reference body 128 has a mirror or a reference surface 130 facing the distance measuring device 70, said mirror or reference surface in the present case being embodied approximately in the style of a cylinder inner wall. The latter is preferably embodied as a concave mirror. The contour of the reference surface 130 should be measured precisely for the purposes of calibrating the measuring apparatus 100. In respect to the position thereof, the contour and the individual points 144 to be probed on the reference surface 130 are known and stored in an evaluation unit of the controller 60.

Figure 2:
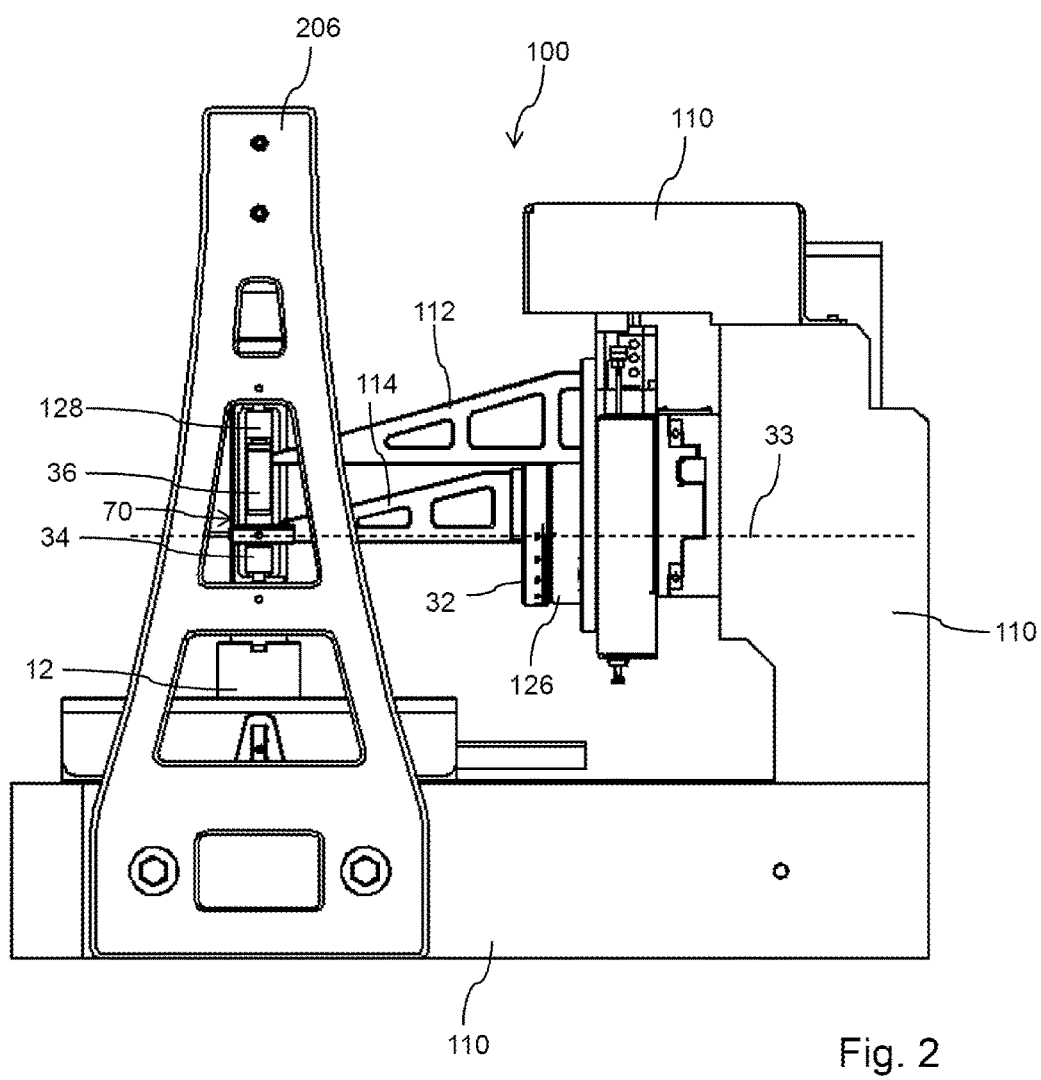
FIG. 2 shows a side view of the apparatus.

The reference body 128 is arranged on the holder 126 by way of a horizontally extending arm 112 while the distance measuring device 70 is arranged on the holder 126 by way of a further arm 114 which extends parallel thereto and which is arranged in a rotatable manner on the base 110, as shown in the side view of FIG. 2.

Figure 5:
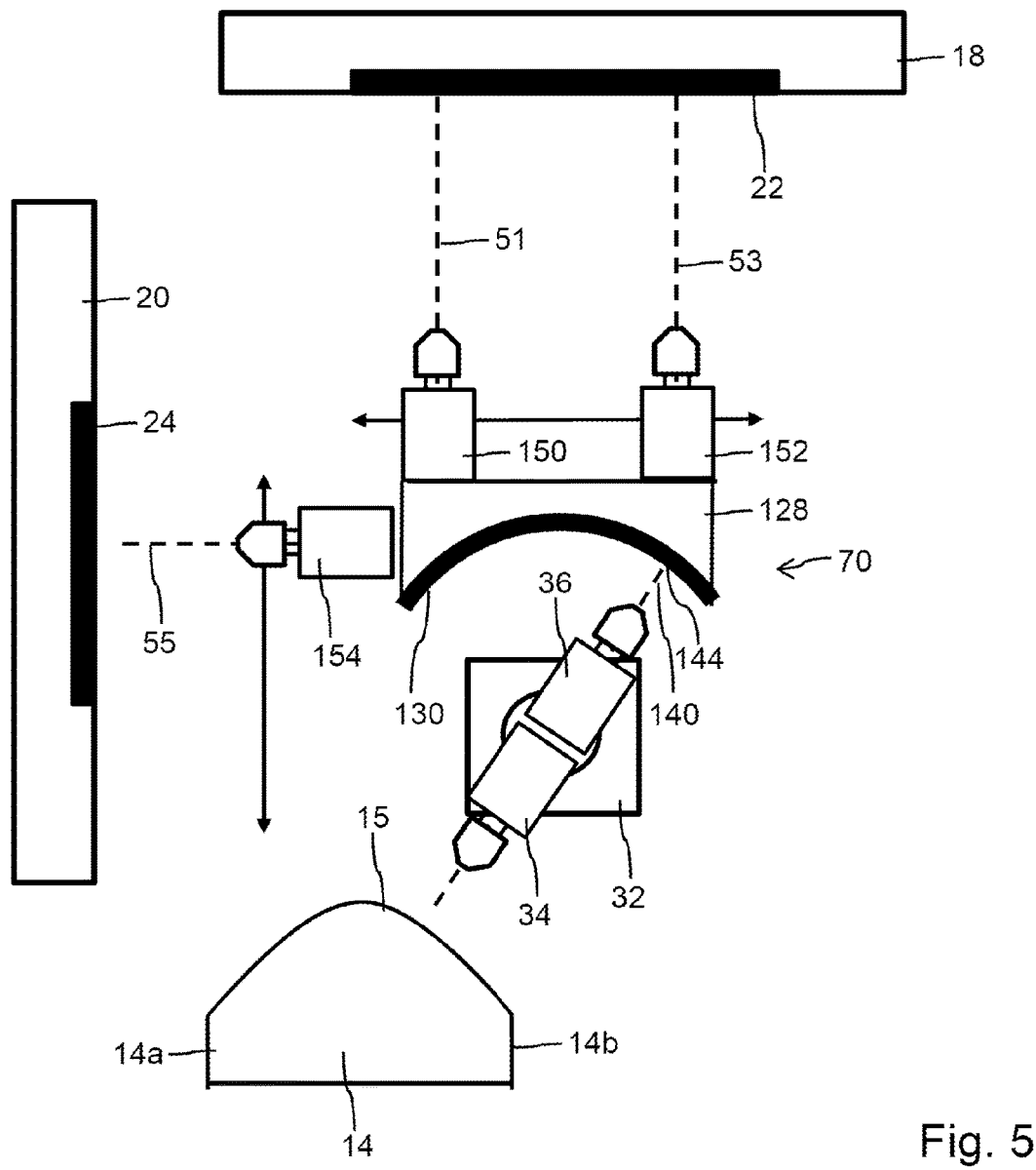
FIG. 5 shows the illustration of the apparatus in accordance with FIG. 4 in a further configuration.

The measuring principle of the apparatus 100 shown in FIG. 1 is depicted in a conceptual manner in the measuring plane (x, z) in FIGS. 4 and 5. The underlying measurement principle, specifically the measurement of the distance 28 between a first distance sensor 34 and a measurement point 42 on the surface 15 of the object 14 and the measurement, accompanying this, of a distance 140 to a reference point 144 of the reference surface 130, corresponding therewith, of the reference body 128 which is modified compared to the prior art, is maintained substantially without change.

The distance measuring device 70 comprising two distance sensors 34, 36 aligned opposite one another is held on the bearing 32 in a rotatable manner in relation to an axis of rotation 33. Here, the axis of rotation 33 preferably extends orthogonal to the plane (x, z) spanned by the two reference objects 18, 20. Here, the distance sensor 34 directed toward the object 14 is preferably embodied as a multi-wavelength sensor embodied to determine an absolute distance to a selected first point 42 on the surface to be measured of the object 14. Also, all further sensors 150, 152, 154 may be embodied as multi-wavelength sensors.

The sensors 34, 36 are fixed to one another. Moreover, they are aligned diametrically opposite to one another in relation to the axis of rotation 33. Hence, a change in the alignment of the sensor 34 is always accompanied by a corresponding change in the direction of the sensor 36.

The sensors 34, 36 measure in reflection geometry. That is to say, the measurement beam directed to the measurement point 42 is identically mirrored back and detected by the sensor 34 again and subsequently fed to a sensor and detection unit of a controller 60, said sensor and detection unit being indicated in FIG. 1 and coupled to the sensor 34. The alignment or orientation of the sensor 34 should be modified depending on the contour of the object 14 to be measured and the relative positioning of the holder 126 in relation to the object 14. However, a rotation of the distance sensor 34, 36 about the axis of rotation 33 may be accompanied by a displacement of the distance sensor 34 in relation to the holder 126.

By virtue of the second distance sensor 36 being aligned in a direction counter to the first sensor 34 onto the reference surface 130 of the reference body 128, a displacement in relation to the known reference body 128 inevitably caused, for instance, by the rotational movement of the distance measuring device 70 may be measured precisely and compensated within the scope of the electronic evaluation of recorded or detected measurement signals.

By way of example, if the sensor 34 experiences, for instance, a displacement in the direction of the object 14 on account of the rotation, this would decrease the distance 38 to be measured. However, such a displacement would, at the same time, quantitatively also increase the second distance 140 between the opposite sensor 36 and the stationary reference surface 130 by the same amount. In this manner, possible positioning accuracies of the distance measuring device 70, caused by rotation, may be compensated precisely by means of the second distance sensor 36 by measuring a second distance 140 in relation to a selected second measurement point 144 on the reference surface 130.

Figure 3:
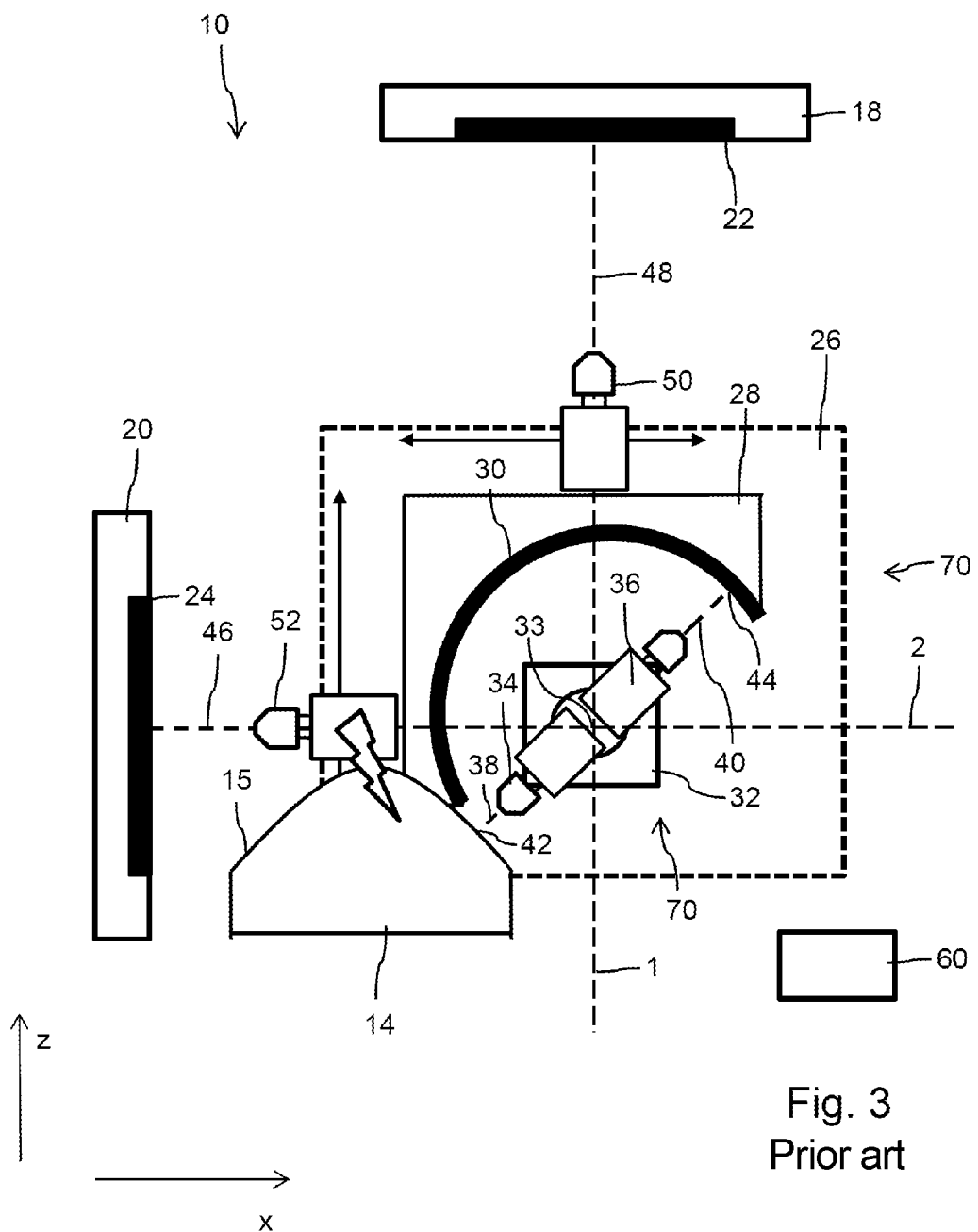
FIG. 3 shows a simplified and schematic illustration of a generic apparatus according to the prior art.

By comparing FIG. 4 or 5 with the prior art in accordance with FIG. 3, it becomes clear that the extent of the reference body 128 is significantly shortened in the vertical z-direction. Accordingly, at least the imaginary extension 2 of a third reference sensor 154 facing the second reference body 20 migrates upward and is no longer superposed on the axis of rotation 33 of the distance measuring device 70 in this respect. A possible tilt or tilting movement of the holder 126 in the measuring plane (x, z), which is unavoidable in view of the required accuracy, therefore has far-reaching consequences in respect of the location and position determination of the axis of rotation 33 of the distance measuring device 70 or of the position and location of the reference object 128.

Thus, two reference sensors 150, 152 with a distance D between them are arranged on the reference object 128 facing the first reference object 18. The first reference sensor 150 serves to measure a first distance 51 to the first reference object 18 or to the reference surface 22 thereof. In accordance with the respective position in the x-direction, the distance 51 from the first reference sensor 150 to a first point 21 on the reference surface 22 is determined in the process. Equally, the second reference sensor 152, which is aligned parallel to the first reference sensor 150, measures a second distance 53 to a second point 23 of the reference surface 22 of the reference object 18.

A possible tilt or inclination of the reference body 128 or of the holder 126 relative to the reference objects 18, 20 is ascertainable from a comparison between the first distance 51 and second distance 53. Here, the inclination is determinable both qualitatively and quantitatively such that a position change of the distance measuring device 70 and of the axis of rotation 33 resulting therefrom may be compensated by computation. The inclination or tilt of the reference body 128 or of the holder 126, ascertainable on the basis of the measurement of the first distance 51 and the second distance 53, may therefore be compensated for by metrological means. The distances ascertainable by means of the distance measuring device 70 and a surface image of the object 14 formable therefrom may be corrected by computation in respect of possible positioning or inclination errors of the reference body 128 or of the distance measuring device 70. The position of the holder 126, or of the reference body 130 arranged thereon, in respect of the x-direction is determinable by means of the third reference sensor 154, which is equally embodied as a distance sensor. A distance 55 to the second reference object 20 or to a reference surface 24 of the reference object 20 is measured thereby.

What the total of three reference sensors 150, 152 and 154 facilitates is that the axis of rotation 33 of the distance measuring device 70 no longer needs to be arranged in a manner covering the imaginary extensions 1, 2 of the reference sensors 150, 152 provided according to the prior art. In this respect, very different geometries for the reference body 128 may be realized which, in particular, facilitate a collision-free scanning or probing of the entire surface 15 of the object 14 to be examined, as emerges from the two different configurations in FIGS. 4 and 5. From a comparison between FIGS. 4 and 5, it is furthermore possible to identify that the distance measuring device 70 or the holder 126 is displaceable beyond the two opposite outer edges 14a, 14b of the object 14 in the region above the carrier 12. In this way, it is particularly possible for geometric measurement of objects 14 which are not rotationally symmetric, such as e.g. cylindrical lenses with a longitudinal extent, also to be carried out.

Figure 6:
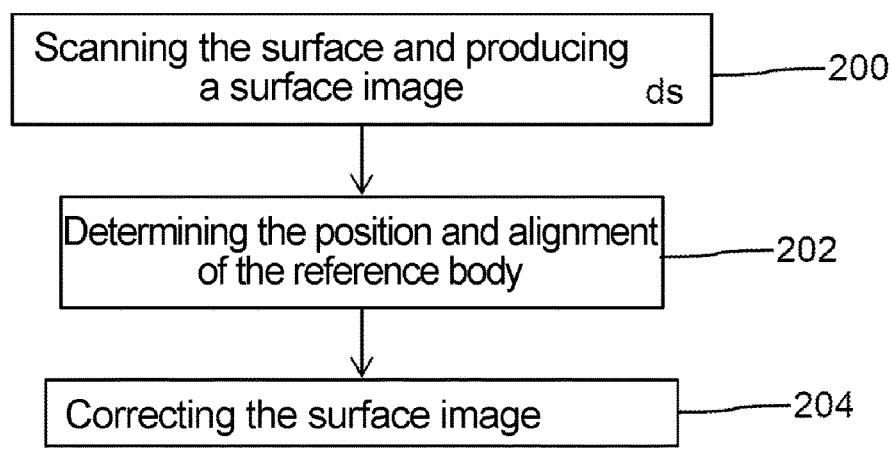
FIG. 6 shows a flowchart of the method.

Finally, FIG. 6 depicts a flowchart of the method. In a first step 200, the surface contour of the object 14 mounted on the carrier 12 is captured in a scanning, in particular surface-probing, manner by means of the distance measuring device 70 arranged on the holder 126 in a rotatable manner. Individual measurement points 42 of the surface 15 of the object 14 are successively impinged by a measurement beam such that a distance to the distance sensor 36 is ascertained for each measurement point 42. In this respect, a number of distances 38 between the measurement points 42 of the object 14 and reference points 140 of the reference body 128 are measured by means of the distance measuring device 70 during a scanning process. From these, a surface image of the object 14 is produced, in particular calculated in a computer-assisted manner.

In a further step 202, which runs at the same time as the first step 200, the position and the alignment of the holder 126, or of the reference body 128 thereof, are ascertained relative to the at least one reference objects 18, 20, typically to both reference objects 18 and 20, by means of the first reference sensor 150 and the second reference sensor 152, and also by means of the third reference sensor 154. To the extent that the apparatus 100 only provides for one degree of freedom of motion for the holder 126, the implementation of only two reference sensors 150, 152, which are typically spaced apart from one another parallel and perpendicular to the measurement direction thereof, is, in principle, sufficient.

In a further step 204, the surface image is corrected on the basis of the position determination and the alignment determination of the holder and/or of the reference body.

The invention claimed is:

1. An apparatus for the geometric measurement of an object, comprising:
a carrier for the object,
at least one reference object fixable in relation to the carrier, and
a holder movable in relation to the at least one reference object in at least one direction, with a reference body and a distance measuring device being arranged on said holder, said distance measuring device being configured to measure a distance between the object and the reference body,
wherein a first reference sensor and a second reference sensor are arranged spaced apart from one another, facing the at least one reference object on the holder or on the reference body, said first reference sensor and said second reference sensor being embodied to measure a first distance and a second distance, respectively, to the at least one reference object,
wherein the holder is movable relative to a first reference object and to a second reference object in a plane (x,z) spanned by a first direction (x) and a second direction (z), and
wherein the first reference sensor and the second reference sensor are aligned to the first reference object and wherein a third reference sensor is aligned to the second reference object.

2. The apparatus as claimed in claim 1, wherein the first reference sensor is embodied to measure the first distance to a first point of a reference surface of the at least one reference object facing the holder or the reference body.

3. The apparatus as claimed in claim 2, wherein the second reference sensor is embodied to measure the second distance to a second point of the reference surface of the at least one reference object facing the holder or the reference body.

4. The apparatus as claimed in claim 3, wherein a distance (d) between the first point and the second point of the reference surface correlates with a distance (D) between the first reference sensor and the second reference sensor.

5. The apparatus as claimed in claim 1, further comprising a controller, by means of which the position and the alignment of the holder, or the reference body thereof, relative to the at least one reference object is determinable from the first distance and the second distance.

6. The apparatus as claimed in claim 1, wherein the first reference object is aligned parallel to the first direction (x) and wherein the second reference object is aligned parallel to the second direction (z).

7. The apparatus as claimed in claim 1, wherein the distance measuring device comprises a first distance sensor and a second distance sensor, which are rotatably mounted relative to the reference body.

8. The apparatus as claimed in claim 7, wherein the first distance sensor faces the carrier and wherein the second distance sensor faces the reference body.

9. The apparatus as claimed in claim 1, wherein an object holder is mounted on the carrier in a rotatable or translationally displaceable manner.

10. The apparatus as claimed in claim 1, wherein the holder is movably arranged on a base above the carrier and is displaceable beyond opposite outer edges of the object.

11. A method for the geometric measurement of an object by means of an apparatus as claimed in claim 1, wherein a surface contour of an object mounted on the carrier is captured in a scanning manner by means of the distance measuring device, the method comprising:
a plurality of distances between the measuring points of the object and reference points of the reference body being measured by means of the distance measuring device and a surface image of the object being generated,
the position and the alignment of the holder, or of the reference body thereof, relative to the at least one reference object being established by means of the first reference sensor and the second reference sensor, and the surface image being corrected on the basis of the position and alignment of the holder, or of the reference body thereof, relative to the at least one reference object.

12. A computer program for the geometric measurement of an object by means of an apparatus comprising:

a carrier for the object, at least one reference object fixable in relation to the carrier, and a holder movable in relation to the at least one reference object in at least one direction, with a reference body and a distance measuring device being arranged on said holder, said distance measuring device being configured to measure a distance between the object and the reference body, wherein a first reference sensor and a second reference sensor are arranged spaced apart from one another, facing the at least one reference object on the holder or on the reference body, said first reference sensor and said second reference sensor being embodied to measure a first distance and a second distance, respectively, to the at least one reference object, said computer program comprising:

program means for capturing a surface contour of an object, mounted on the carrier, in a scanning manner by means of the distance measuring device, program means for measuring a plurality of distances between the measuring points of the object and reference points of the reference body and for generating a surface image of the object, program means for ascertaining a position and alignment of the holder, or of the reference body thereof, relative to the at least one reference object by means of the first reference sensor and the second reference sensor, and program means for correcting the surface image on the basis of the position and alignment of the holder, or of the reference body thereof, relative to the at least one reference object.

13. An apparatus for the geometric measurement of an object, comprising:

a carrier for the object, at least one reference object fixable in relation to the carrier, and a holder movable in relation to the at least one reference object in at least one direction, with a reference body and a distance measuring device being arranged on said holder, said distance measuring device being configured to measure a distance between the object and the reference body, wherein a first reference sensor and a second reference sensor are arranged spaced apart from one another, facing the at least one reference object on the holder or on the reference body, said first reference sensor and said second reference sensor being embodied to measure a first distance and a second distance, respectively, to the at least one reference object, wherein the first reference sensor is embodied to measure the first distance to a first point of a reference surface of the at least one reference object facing the holder or the reference body, wherein the second reference sensor is embodied to measure the second distance to a second point of the reference surface of the at least one reference object facing the holder or the reference body, and wherein a distance (d) between the first point and the second point of the reference surface correlates with a distance (D) between the first reference sensor and the second reference sensor.

14. The apparatus as claimed in claim 13, wherein the holder is movable relative to a first reference object and to a second reference object in a plane (x,z) spanned by a first direction (x) and a second direction (z).

15. The apparatus as claimed in claim 14, wherein the first reference sensor and the second reference sensor are aligned to the first reference object and wherein a third reference sensor is aligned to the second reference object.

16. A method for the geometric measurement of an object by means of an apparatus as claimed in claim 13, wherein a surface contour of an object mounted on the carrier is captured in a scanning manner by means of the distance measuring device, the method comprising:

a plurality of distances between the measuring points of the object and reference points of the reference body being measured by means of the distance measuring device and a surface image of the object being generated, the position and the alignment of the holder, or of the reference body thereof, relative to the at least one reference object being established by means of the first reference sensor and the second reference sensor, and the surface image being corrected on the basis of the position and alignment of the holder, or of the reference body thereof, relative to the at least one reference object.

17. A computer program for the geometric measurement of an object by means of an apparatus as claimed in claim 13, said computer program comprising:

program means for capturing a surface contour of an object, mounted on the carrier, in a scanning manner by means of the distance measuring device, program means for measuring a plurality of distances between the measuring points of the object and reference points of the reference body and for generating a surface image of the object, program means for ascertaining a position and alignment of the holder, or of the reference body thereof, relative to the at least one reference object by means of the first reference sensor and the second reference sensor, and program means for correcting the surface image on the basis of the position and alignment of the holder, or of the reference body thereof, relative to the at least one reference object.

* * * * *